(12) United States Patent  (10) Patent No.: US 7,647,131 B1
Sadowski et al.  (45) Date of Patent: Jan. 12, 2010

(54) DYNAMIC DETERMINATION OF SAMPLING RATES

(75) Inventors: Randall P. Sadowski, Hookstown, PA (US); John T. Campbell, Jr., Bridgeville, PA (US); Mark A. Glavach, Slippery Rock, PA (US); Scott A. Miller, Oakdale, PA (US); Keith A. Overstreet, Pittsburgh, PA (US); David T. Sturrock, Evans City, PA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 438 days.

(21) Appl. No.: 11/371,764

(22) Filed: Mar. 9, 2006

(51) Int. Cl.
*G06F 19/00* (2006.01)
*G06F 17/18* (2006.01)
(52) U.S. Cl. .................. 700/108; 702/83; 702/181
(58) Field of Classification Search .............. 700/46, 700/108; 318/636; 702/83, 178, 181, 182, 702/185
See application file for complete search history.

(56) References Cited

U.S. PATENT DOCUMENTS

| 4,996,655 | A | 2/1991 | Chadwick et al. | |
|---|---|---|---|---|
| 5,459,675 | A | 10/1995 | Gross et al. | |
| 5,586,066 | A | 12/1996 | White et al. | |
| 5,689,682 | A * | 11/1997 | Peasley et al. | 703/6 |
| 6,442,496 | B1 * | 8/2002 | Pasadyn et al. | 702/83 |
| 6,490,572 | B2 | 12/2002 | Akkiraju et al. | |
| 6,975,944 | B1 | 12/2005 | Zenhausern | |
| 7,233,915 | B2 * | 6/2007 | Metcalfe | 705/26 |
| 7,257,502 | B1 * | 8/2007 | Qu et al. | 702/83 |
| 2003/0029946 | A1 | 2/2003 | Lieber et al. | |
| 2003/0208731 | A1 * | 11/2003 | Miwa | 716/4 |
| 2004/0030418 | A1 | 2/2004 | Hamm et al. | |
| 2004/0088116 | A1 | 5/2004 | Khalil et al. | |
| 2005/0088653 | A1 | 4/2005 | Coatesm et al. | |
| 2005/0246044 | A1 * | 11/2005 | Conrad et al. | 700/108 |
| 2006/0050953 | A1 | 3/2006 | Farmel et al. | |
| 2006/0259154 | A1 * | 11/2006 | Hood et al. | 700/2 |

* cited by examiner

*Primary Examiner*—Paul L Rodriguez
*Assistant Examiner*—Sheela Rao
(74) *Attorney, Agent, or Firm*—Turocy & Watson LLP; William R. Walbrun

(57) ABSTRACT

A system that facilitates determination of a sampling rate to utilize in connection with sampling data in an industrial environment comprises a receiver component that receives data from an I/O port of a controller. An analysis component automatically and dynamically determines a rate at which data associated with the I/O port is to be sampled based at least in part upon the received data. The system can further comprise a sampling component that samples data at the rate determined by the analysis component.

28 Claims, 13 Drawing Sheets

DYNAMIC DETERMINATION OF SAMPLING RATES

TECHNICAL FIELD

The claimed subject matter relates generally to industrial processes and, more particularly, to dynamically and automatically determining data sampling rates associated with one or more industrial processes.

BACKGROUND

Due to advances in computing technology, businesses today are able to operate more efficiently when compared to substantially similar businesses only a few years ago. For example, networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing databases or web services referencing databases that are accessible by system/process/project managers on a factory floor. For instance, sensors and associated software can detect a number of instances that a particular machine has completed an operation given a defined amount of time. Further, data from sensors can be delivered to a processing unit related to system alarms. Utilizing such data, industrial applications are now becoming partially and/or completely automated.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with source and/or destination. More particularly, industrial controllers include communications ports and/or adaptors, and sensors, actuators, drives, and the like are communicatively coupled to such ports/adaptors. Thus, a controller can recognize device identity when data is received and further deliver control data to an appropriate device.

Controllers can also be employed in connection with creating logs of events, sensed data, and the like that are associated with industrial environments. In fact, some regulatory agencies require generation of audit logs for manufacture of particular consumables. In more detail, consumables such as food and pharmaceuticals, if not manufactured precisely according to a particular recipe, can cause significant injury to those consuming such goods. Thus, regulatory agencies attempt to protect the general public by ensuring that products are made according to recipe. Often, companies manufacturing items want to closely track production of such items for quality assurance and to aid in avoidance of liability.

When tracking manufacture of consumables or other items, various sampling rates must be set. For example, it may be desirable to sample temperature of an oven once every thirty seconds. The sampling rate is defined a priori by an operator or other individual with knowledge of the process. Problems can arise, however, if conditions associated with the process alter. For instance, ideally the temperature of the oven is to remain constant, such that sampling at the selected sampling rate is adequate with respect to a number of measurements retained. If, however, problems arise with respect to the oven, the temperature can change drastically in a short amount of time. The sampling rate, however, remains unchanged such that time of malfunction of the oven can be difficult to discern.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Tracking and retaining data within a factory environment are extremely important tasks. For instance, it is often desirable to create a log of events that happened in the past to analyze a process (e.g., to ensure that a process was completed according to specifications). The claimed subject matter described herein relates to automatically and dynamically determining sampling rates at which to sample data that is generated on a factory floor. To that end, I/O ports and/or cards associated with one or more controllers can be monitored, and based upon such monitoring a sampling rate associated with a subset of the I/O ports and/or cards can be automatically and dynamically determined. The determined sampling rate can automatically be altered over time as conditions within a factory environment change. For instance, a greater number of samples may be desirably obtained if a condition rapidly alters over a short period of time. Additionally, a manner in which to aggregate and index tracked data can be automatically determined and effectuated. For example, a hierarchical arrangement of data repositories can exist within a factory environment and data can automatically be aggregated upwards through the hierarchy. Furthermore, aggregated data can be automatically indexed to effectuate efficient retrieval of such data at later instances in time.

To aid in determining sampling rates associated with I/O ports or cards on one or more controllers, historic data associated with a factory retained in at least one data repository can be subject to data mining. Utilization of data mining on historical plant data enables correlations to be determined between events, variables within data, correlations, trends, and the like. These correlations, etc. can then be analyzed in connection with current data to assist in determining a sampling rate at which to sample data associated with the controllers. Pursuant to an example, performance of data mining can result in discerning a relationship between a temperature of an oven and a position of an actuator. Data received, output, and/or generated by one or more controllers can then be monitored and analyzed to determine whether current data correlates to the relationship discerned through data mining.

Additionally, data sampled at dynamically determined sampling rates and retained for analysis purposes can also be utilized to update and/or improve a simulation or simulation engine. Thus, real-world factory data can be utilized in connection with simulating a process going forward. For instance, conventionally simulations are generated prior to setting up a process to determine whether the desired process is feasible as well as to estimate inefficiencies associated with the process. Once the process is running, the simulation is typically discarded. As described in detail below, however, the claimed subject matter contemplates receipt of data at a simulation engine and updating of such simulation engine based upon actual data from the factory floor. Thereafter, the simulation can be implemented to enable obtainment of more accurate estimations.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
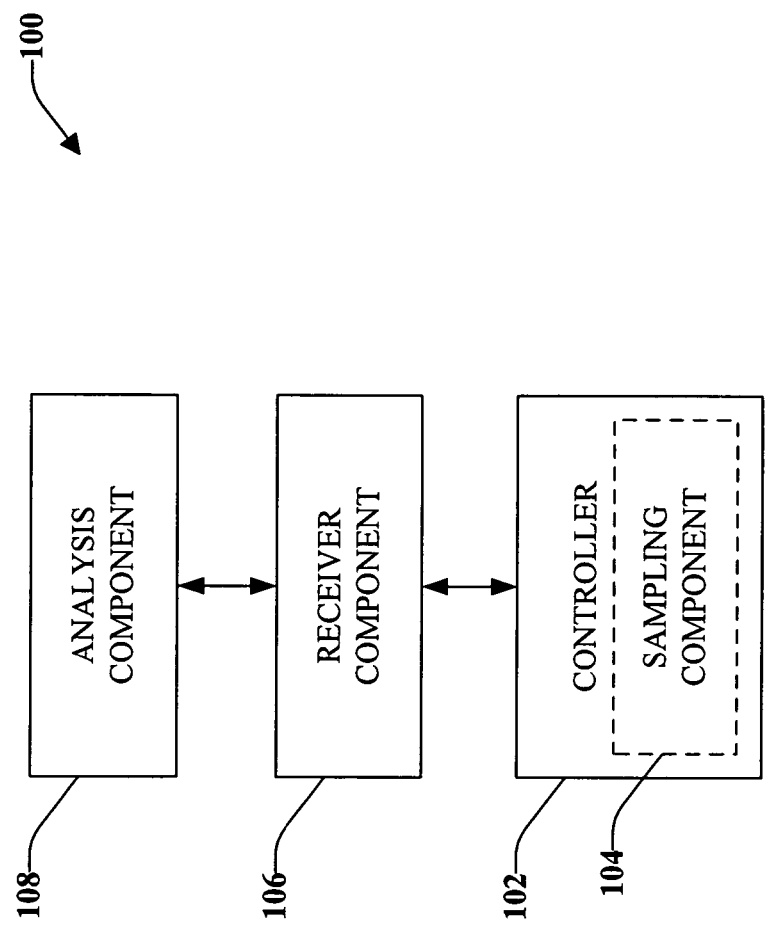
FIG. 1 is a high level block diagram of a system that enables sampling rates associated with a controller to be automatically and dynamically altered.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Additionally, as used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates an industrial data sampling and analysis system 100 that can be utilized in a factory environment. The system 100 includes a controller 102 that is employed to aid in controlling one or more processes on a factory floor. The controller 102, for example, can be associated with a plurality of other controllers to effectuate control of a process (e.g., the controller 102 can be communicatively coupled to several other controllers in a rack by way of a backplane). The controller 102, in connection with controlling one or more processes, can receive status of sensors, actuators, drives, and the like, and based at least in part upon the statuses (and control logics associated with the controller 102) the controller 102 can alter status/position of actuators. The controller 102 can include a sampling component 104 that is associated with sampling status of sensors, actuators, and the like at desirable data rates. While shown as being within the controller 102, it is understood that the sampling component 104 can be external to the controller 102. For instance, a sensor monitored by the controller 102 can be an analog sensor such that the controller 102 is continuously receiving data from the sensor. The controller 102 can output such sensed data as it is received, and the sampling component 104 can sample such sensed data at an appropriate sampling rate.

Furthermore, data sampled by the sampling component 104 can be utilized for aid in controlling a process or processes and/or for data retention purposes (e.g., audit related information). For example, a data maintenance application may desirably retain data sampled at particular rates, index such data, and the like. Thereafter, one desiring to locate certain data can do so according to the indexing. Selective retention of data may be useful for audit purposes, to aid in avoidance of liability, quality assurance, and the like. Such data collection and retention applications are commonly employed in industrial applications and are known in the art.

The controller 102 is communicatively coupled with a receiver component 106 that receives sensed data (continuous, in the form of samples taken at a particular rate, or other sensed data). For example, the receiver component 106 can be hardware, such as cabling, an I/O port, etc., software that effectuates receipt of data, or a combination of hardware and software. An analysis component 108 can analyze the received data and automatically and dynamically determine a sampling rate at which data is sampled and/or stored. For instance, the analysis component can determine that conditions associated with the controller 102 have changed such that the sampling rate utilized by the sampling component 104 to sample sensed data should be altered. Pursuant to a specific example, the sampling component 104 can be sampling a temperature at a rate of once per thirty seconds. The analysis component 108 can determine that temperature is fluctuating in such a manner that the sample rate should be altered (e.g., more samples should be taken per unit of time). The analysis component 108 can then update the sampling component 104 with a dynamically determined sampling rate.

The analysis component 108 can determine a desired sampling rate based at least in part upon data received at and/or output from the controller 102, based at least in part upon historical data in combination with current data output from the controller 102, based at least in part upon historical data associated with disparate (but related) controllers, based at least in part upon data output from related controllers, and/or any suitable combination thereof. Additionally, the analysis component 108 can automatically and dynamically determine a sampling rate at which to sample sensed data based upon current context and/or previous context, such as time of day, status of other actuators or sensors, and the like. For instance, the analysis component 108 can include algorithm(s) and/or models that enable a sampling rate to be automatically determined based upon one or more factory-related parameters. In contrast, in conventional data retention systems, a sampling rate is determined at setup of a process and remains static, even if conditions associated with the process alter. The only manner for updating the sampling rate is manually doing so—often, such manual updating happens too late to determine source of a problem or adequately represent a process.

Figure 2:
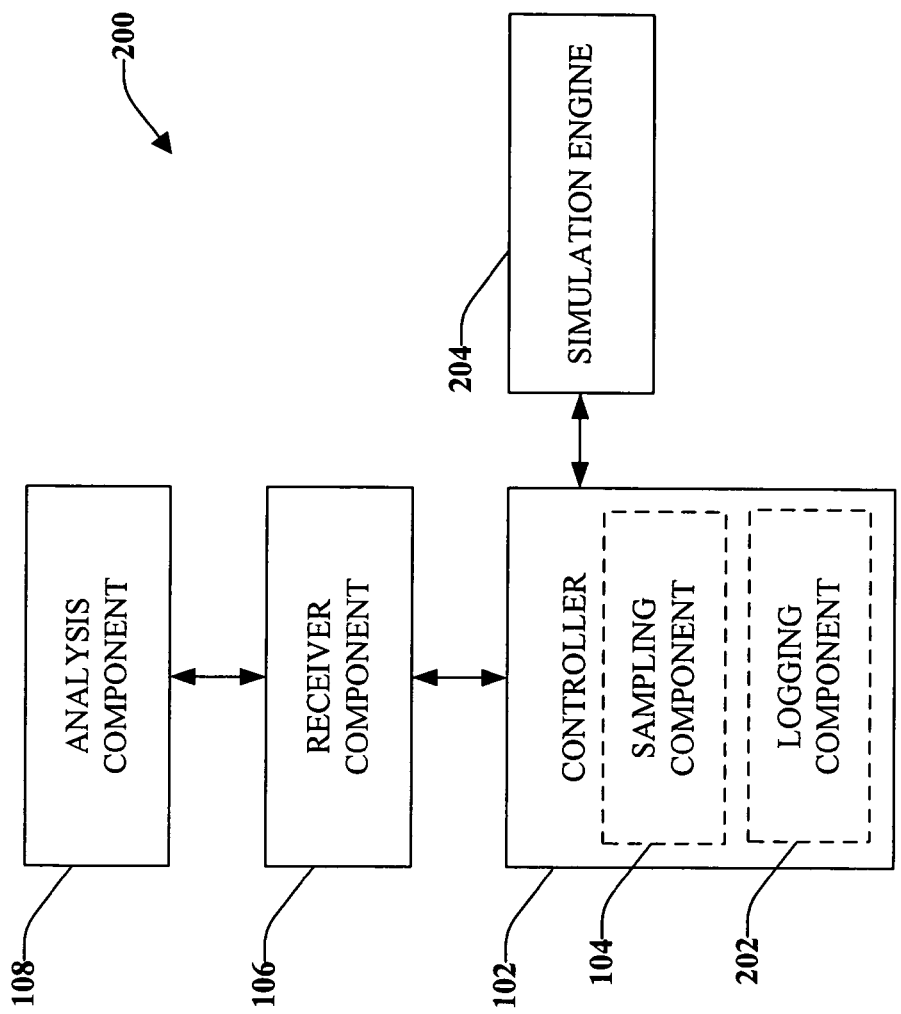
FIG. 2 illustrates a system that facilitates updating a simulation engine based at least in part upon data sampled from an I/O port of a controller.

Referring now to FIG. 2, a system 200 that facilitates automatic determination of sampling rates with respect to retaining/logging data in an industrial environment is illustrated. The system 200 includes the controller 102 that is utilized to control a process or processes based at least in part upon sensor status, actuator status, and the like. The controller 102 is associated with the sampling component 104, which samples data received from one or more sensors at rates determined by the analysis component 108. As described above, while the sampling component 104 is shown as being comprised by the controller 102, it is understood that such component can be external to the controller 102, such as in an Object Linking and Embedding for Process Control (OPC) server. For instance, the controller 102 can receive/output continuous data from a sensor, and the sampling component 104 can sample such data for data retention as prescribed by the analysis component 108. The receiver component 106 can act as an interface between the controller 102 and/or the sampling component 104 and the analysis component 108. For instance, the receiver component 106 can be an I/O port, cabling, software, and the like. The analysis component 108 can automatically and dynamically determine a rate at which the sampling component 104 should sample data associated with the controller 102 for data retention purposes. For instance, altering conditions (or prediction of altering conditions) may be associated with a desire to alter a sampling rate. Conventionally, the sampling rate for logging data is static while a process is running, and to alter the sampling rate an operator must manually alter a data retention/logging system. The system 200 enables the sampling rate to be dynamically altered based upon current factory conditions, past factory conditions, and/or predicted factory conditions.

The system 200 can additionally include a logging component 202 that logs samples output by the sampling component 104. For example, the sampling component 104 can sample particular data, and the logging component 202 can cause such samples to be stored and indexed in a desired location. For instance, the logging component 202 can be associated with a data repository (not shown) and can cause samples obtained by the sampling component 104 to be stored therein. Additionally, the logging component 202 can index the samples so that generation of an audit log can be easily generated, manual search of logged data can be easily conducted, etc. While shown as being within the controller 102, it is understood that the logging component 202 can be external to the controller 102. Furthermore, the logging component 202 can be associated with multiple controllers (not shown), and can cause sampled data to be indexed and retained in suitable locations.

The logging component 202 can be associated with a simulation engine 204 that is utilized to simulate one or more processes associated with the controller 102. Conventionally, simulations are designed and run prior to implementing a process, and are thereafter not employed again. The system 200 enables the simulation engine 204 to be updated with process data that is collected by the logging component 202, wherein rate of sampling of data logged by the logging component 202 can be automatically determined by the analysis component 108. Thus, the simulation engine 204 can output simulations relating to a process associated with the controller 102 that is highly accurate. For example, at initial setup of the simulation engine 204, such engine 204 can output a simulation that predicts an amount of product that can be manufactured over time. If the simulation engine 204 is updated with data that is logged by the logging component 202, the simulation engine 204 can output more precise predictions. For instance, after a particular amount of data has been logged by the logging component 202 and provided to the simulation engine 204, the simulation engine 204 can re-estimate an amount of time needed to complete a work order, for example. The simulation engine 204 can generate three-dimensional simulations of a process, can utilize digital video or still-photos, and the like to output realistic simulations. Still further, the simulation engine 204 can generate simulations that are indicative of failure of a machine based at least in part upon data received from the logging component 202.

Figure 3:
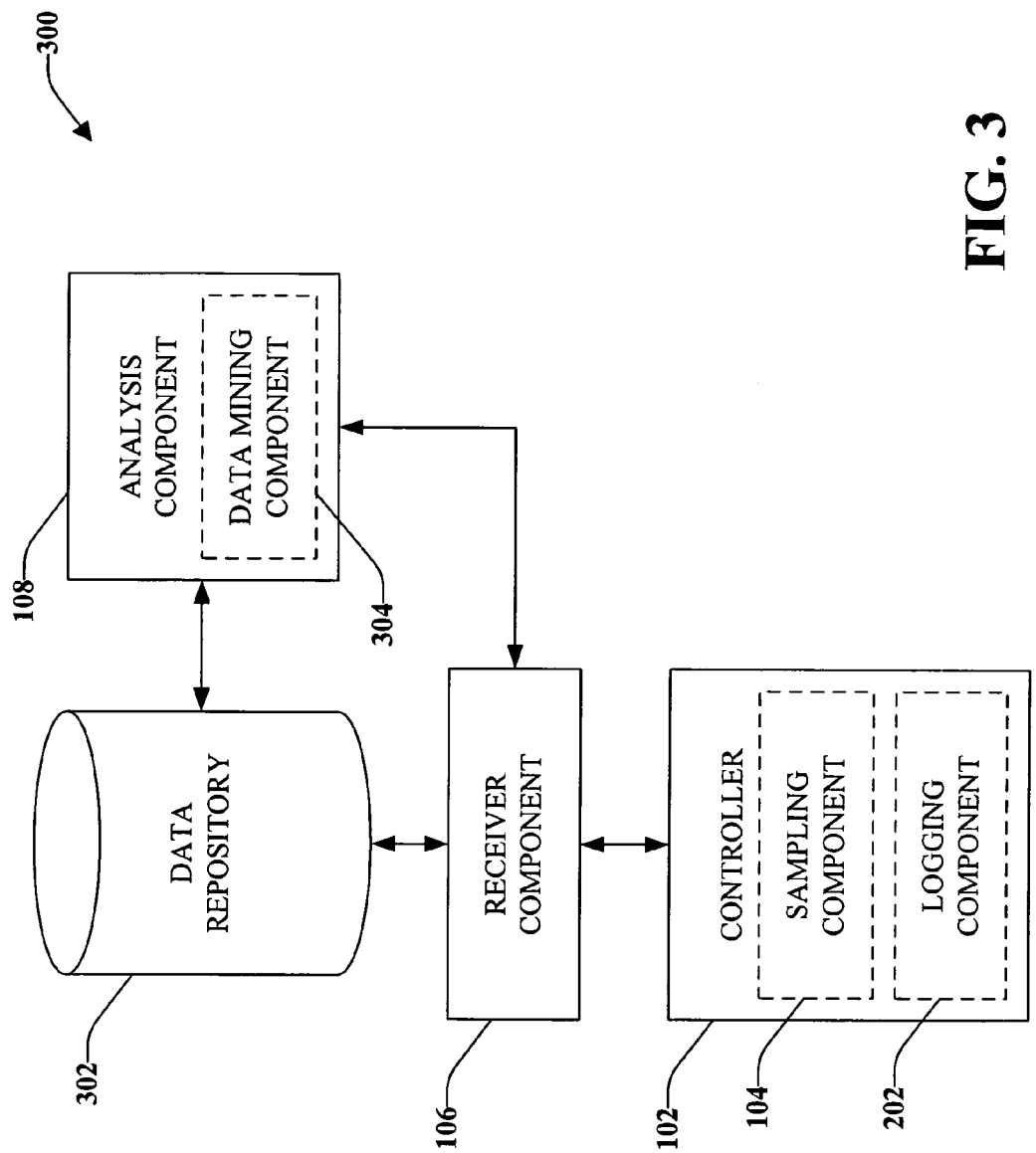
FIG. 3 illustrates a system that utilizes data mining in connection with automatically and dynamically determining sampling rates associated with a controller for retention of data.

Referring now to FIG. 3, a system 300 that can be utilized to automatically determine a rate at which to sample data associated with a controller is illustrated. The system 300 includes the controller 102, which can be a programmable logic controller, a robotic controller, or any other suitable type of controller. The controller 102 is associated with the sampling component 104, which samples data that is received by, generated by, and/or output from the controller 102. The logging component 202 can then be employed to log sampled data by directing such data to a data repository 302. The data repository 302 can include, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data repository 302 is intended to comprise, without being limited to, these and any other suitable types of data storage devices/parameters. In addition, it is to be appreciated that the data repository 302 can be a server, a database, a hard drive, a distributed database, and the like.

If the logging component 202 is located within or proximate to the controller 102, the receiver component 106 can act as an intermediary between the logging component 202 and the data repository 302. In another example, the logging component 202 can reside proximate to or within the data repository 302, in which case the receiver component 106 can act as an interface between the controller 102 and the data repository 302/logging component 202.

The analysis component 108 is communicatively coupled to the data repository 302, such that the analysis component 108 can perform data mining on data residing within the data repository. In more detail, the analysis component 108 can include a data mining component 304 that can perform data mining on data within the data repository 302 to locate correlations between variables within the data, determine patterns and trends within the data, etc. Data mining involves automatically searching stores of data for various patterns, and can employ computational techniques from statistics, machine learning, pattern recognition, and the like. If the data mining component 304 does not include an underlying theoretical model, such component 304 may utilize stepwise regression methods. Additionally or alternatively, the data mining component 304 can include a theoretical model that facilitates pattern recognition, such as a Bayesian Model. As will be understood by one skilled in the art, however, any suitable model can be employed in connection with the data mining component 304 to aid in performance of data mining on data resident within the data repository 302.

In operation, the data mining component 304 can determine trends, patterns, correlations, and the like within data that is retained within the data repository 302, wherein such trends, patterns, correlations, etc. may be indicative of an alteration in conditions upon a factory floor. In a specific example, over time it can be discerned that a certain sequence of events causes temperature to rise rapidly within an oven, and that it is desirable to increase a sampling rate associated with one or more sensors. The analysis component 108 can utilize data mining undertaken by the data mining component 304 to determine when to alter a sampling rate and how much to alter a sampling rate (or to start sampling with respect to a particular sensor). Furthermore, the analysis component 108 can employ sensor fusion techniques in connection with determining when/how to alter a data sampling rate with respect to one or more sensors. The analysis component 108 can then dynamically update the sampling component 104 to sample one or more sensors at the determined sampling rate.

Figure 4:
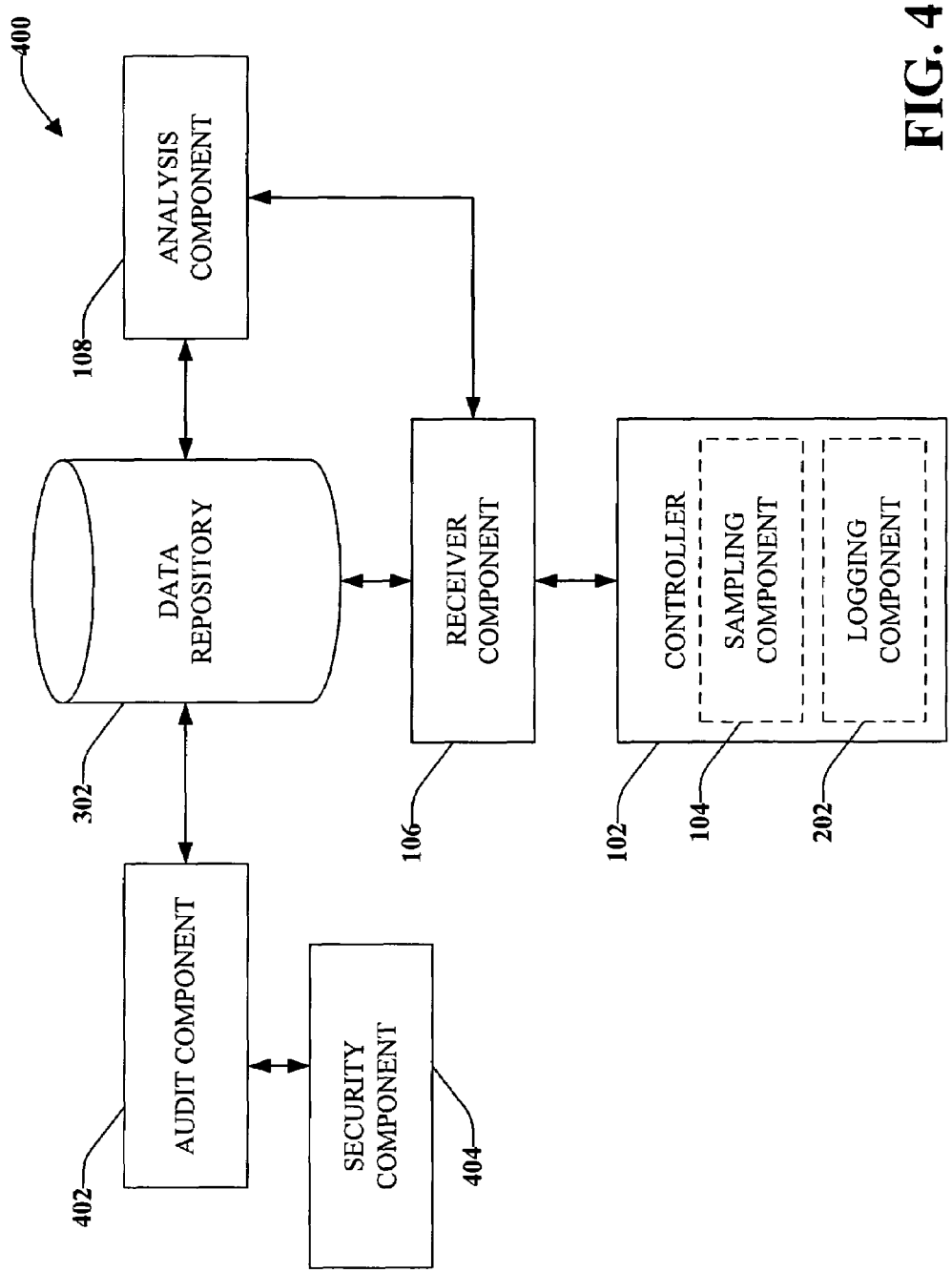
FIG. 4 illustrates a system that facilitates generation of an audit log given historical data associated with an industrial environment.

Now referring to FIG. 4, a system 400 that can dynamically update a sampling rate for retaining data in an industrial environment is illustrated. The system 400 includes the controller 102 that is utilized in connection with controlling one or more industrial processes. As described above, the controller 102 can receive status of sensors, actuators, drives, and the like and can alter status of actuators, drives, etc. based at least in part upon a control program and statuses of sensors. The sampling component 104 can sample data received at, output from, and/or generated by the controller at sampling rates that are automatically and dynamically determined by the analysis component 108. The receiver component 106 can act as an interface between the controller 102 and the analysis component 108. The logging component 202 can cause data that is sampled by the sampling component 104 to be stored within the data repository 302.

The system 400 can additionally include an audit component 402 that can create audit logs of data that resides within the data repository 302. For instance, the audit component 402 can include an interface that enables an operator to select type of audit desired, timeframe or process with respect to which the audit should be generated, a particular controller for which an audit log is desired, and the like. The audit component 402 can then locate appropriate data from within the data repository 302 and format an audit log according to the user request. Furthermore, the audit component 402 can generate audit logs with respect to multiple controllers, can access multiple data repositories in connection with generating audit logs, and the like.

The audit component 402 can also be associated with a security component 404 that ensures that an individual requesting generation of the audit log is authorized to undertake such request. For example, the security component 404 can be associated with a security server (not shown) that includes a database of users and access privileges associated therewith. Based upon determined user identity, the security component 404 can restrict access to the audit component 402 (as well as other components of the system 400). For example, a particular user may be authorized to generate an audit log with respect to a particular portion of a process while not authorized to create an audit log with respect to a disparate portion of the process. The security component 404 can authenticate identity of a user through utilization of user names, passwords, personal identification numbers (PINs), biometric indicia (such as voice analysis, fingerprint analysis, retina scans, . . . ), or any other suitable manner for authenticating identity of a user. Similarly, the security component 404 can be associated with the sampling component 104, such that only those authorized to manually alter a sampling rate may do so. Moreover, the security component 404 can be associated with the data repository 302. For example, certain users may have authority to transfer data from the data repository 302 to a different storage location (e.g., for archiving purposes). The security component 404 can restrict access to the data repository 302 based at least in part upon privileges associated with users requesting access to the data repository 302.

Figure 5:
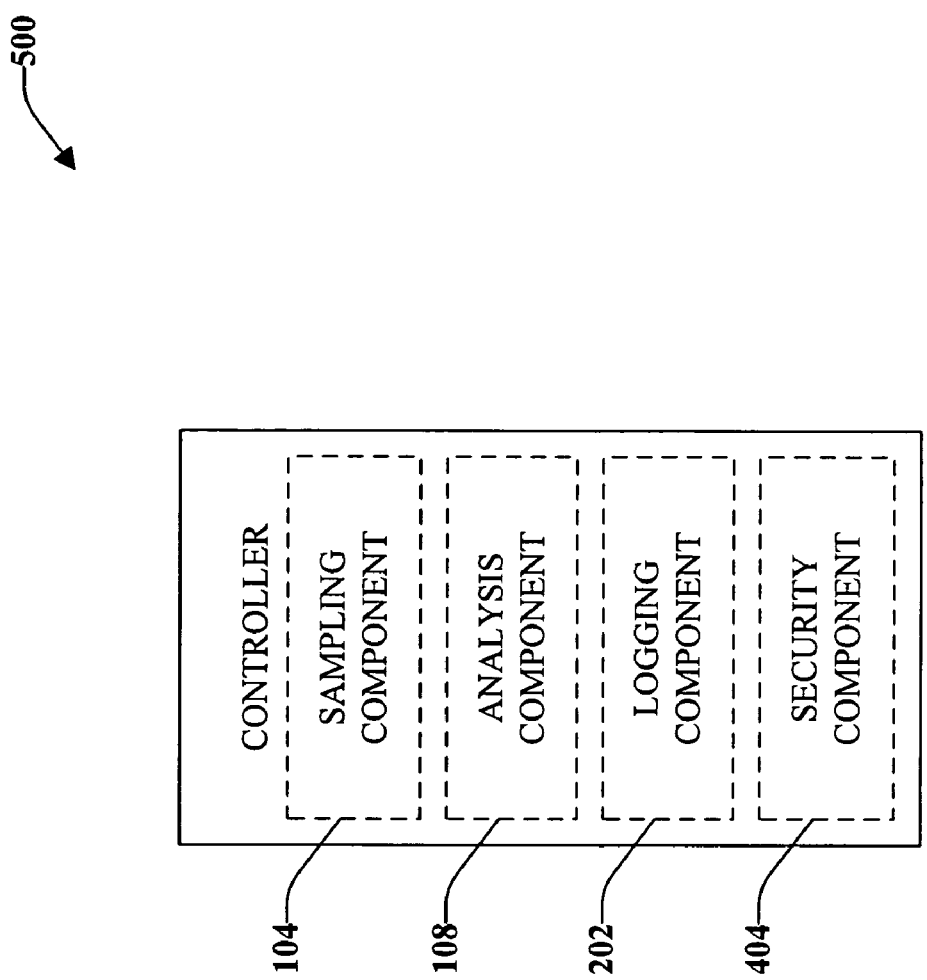
FIG. 5 illustrates a controller that can alter sampling rates utilized in connection with retaining data.

Turning now to FIG. 5, an exemplary industrial controller 500 is illustrated. The controller 500 can be utilized to control at least a portion of an industrial process. In more detail, the controller 500 can include memory (not shown) that retains a control program and at least one processor (not shown) that executes the control program. Furthermore, the controller 500 can include various I/O ports, such that data can be received from sensors and actuators can be positioned according to the received data. The controller 500 can additionally include the sampling component 104 that samples data that is received at one or more of the I/O ports at a rate that is determined by the analysis component 108. As described above, the analysis component 108 can analyze currently received data, historical data, contextual data, and/or a combination thereof in connection with automatically and dynamically determining a sampling rate that is to be employed by the sampling component 104. The logging component 202 can then log such data by directing the data to storage internal to the controller (not shown) and/or to one or more data repositories external to the controller. The security component 404 can be employed to ensure that users accessing the controller 500 are authorized to undertake such access.

The controller 500 is shown herein to illustrate, if associated with sufficient processing capabilities and intelligence, that the controller 500 can include the sampling component 104, the analysis component 108, the logging component 202, and/or the security component 404. The controller 500 can also include other components, such as an audit component, a data mining component, and any other suitable component that may aid in automatically and dynamically determining a rate at which data associated with the controller 500 is sampled (for data retention purposes). It is also understood that any of the components illustrated as residing within the controller 500 can also be external to the controller. For instance, the sampling component 104 and the analysis component 108 can reside within a server that is above a factory floor.

Figure 6:
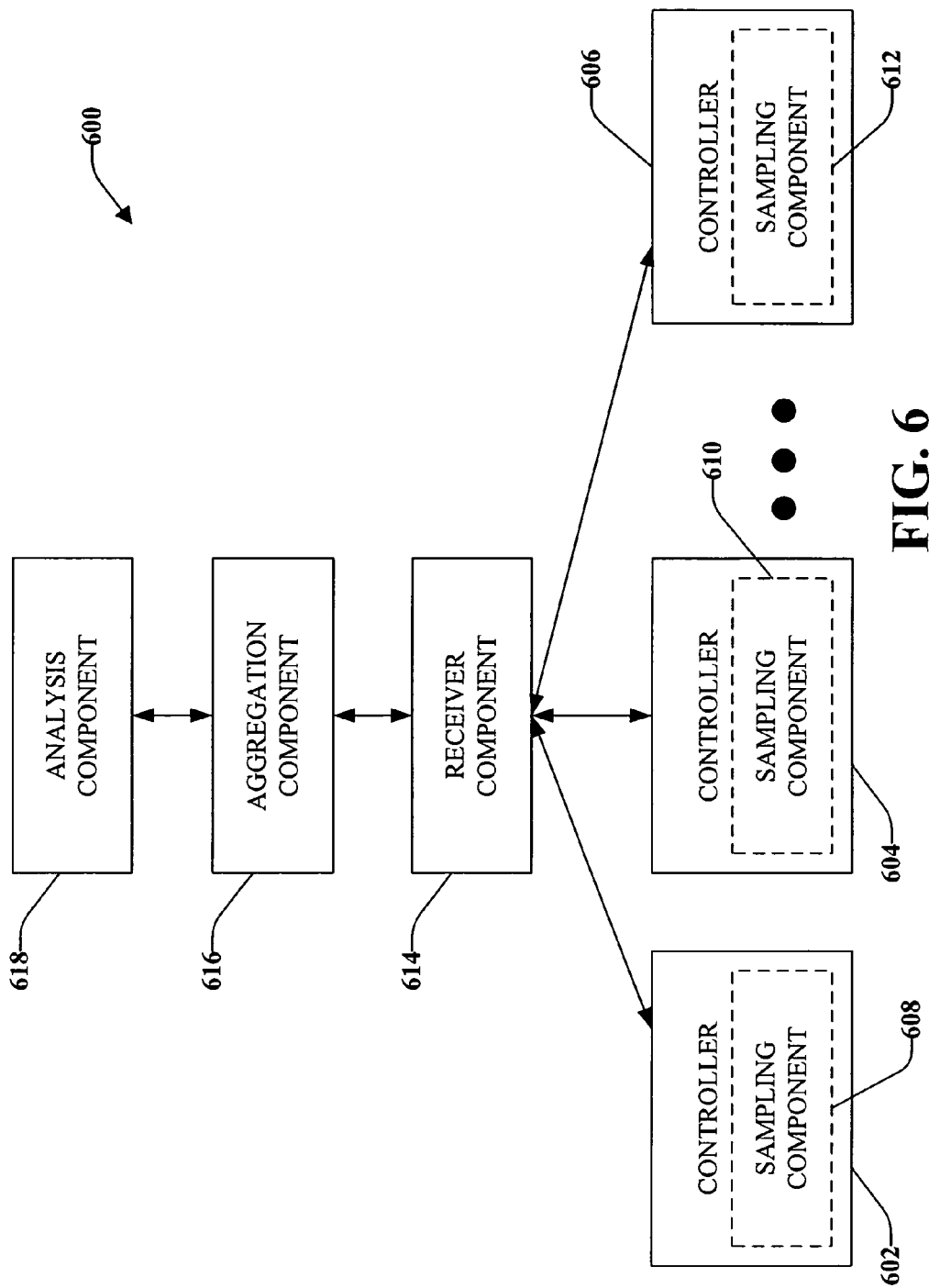
FIG. 6 illustrates monitoring multiple controllers and automatically and dynamically determining sampling rates associated with I/O ports of the multiple controllers.

Now referring to FIG. 6, an exemplary data sampling system 600 for utilization in an industrial environment is illustrated. The system 600 includes a plurality of controllers 602-606 that are in some manner associated. For instance, the controllers 602-606 can work in conjunction to effectuate completion of a process. In another example, the controllers 602-606 can be geographically distributed but operate in similar situations (e.g., used to control similar portions of disparate processes). Each of the controllers 602-606 can include a sampling component 608-612 which prescribes a rate at which data received at the controllers 602-606, output by the controllers 602-606, and/or generated by the controllers 602-608 is sampled. Additionally or alternatively, one or more sampling components can be external to the controllers 602-606 and prescribe sampling rates associated with each of the controllers 602-606. It is understood that different sampling rates can be associated with different I/O ports of the controllers 602-606. The sampling component(s) 608-612, whether they are within the controllers 602-606 or external thereto, can be employed to mitigate a need for users to define what data is to be collected from the controllers 602-606 and at what rate such data is to be collected. Thus, users need not determine what data is valuable and which data should be discarded. The sampling component(s) 608-612 can be in the form of a piece of hardware that can be coupled to a backplane associated with the controllers 602-606. For example, a sampling component can be coupled to a backplane associated with the controllers 602-606 and can monitor such controllers, review I/O cards, and determine what data should be stored and indexed automatically.

Data sampled by the sampling components 608-612 can be received by a receiver component 614, which can be hardware, software, or a combination thereof. The receiver component 614 can aid in exchange of data between the sampling components 608-612 and an aggregation component 616, which can automatically aggregate sampled data from the plurality of controllers 608-612. Additionally, the aggregation component 616 can aid in indexing data received from the controllers 602-606 as well as determining a data repository within which to store aggregated data. For example, while not shown, the aggregation component 616 can be associated with a hierarchical arrangement of data repositories, and the aggregation component 616 can aid in determining manners in which data is aggregated through the hierarchy. An analysis component 618 can also receive aggregated data from the aggregation component 616 and/or the receiver component 614 and can automatically and dynamically determine sampling rates to be employed by the sampling components 602-606. For example, given current and past data associated with the controllers 602-606, the analysis component 618 can automatically and dynamically alter sampling rates of the sampling components 602-606 to enable robust and meaningful collection and retention of data.

Figure 7:
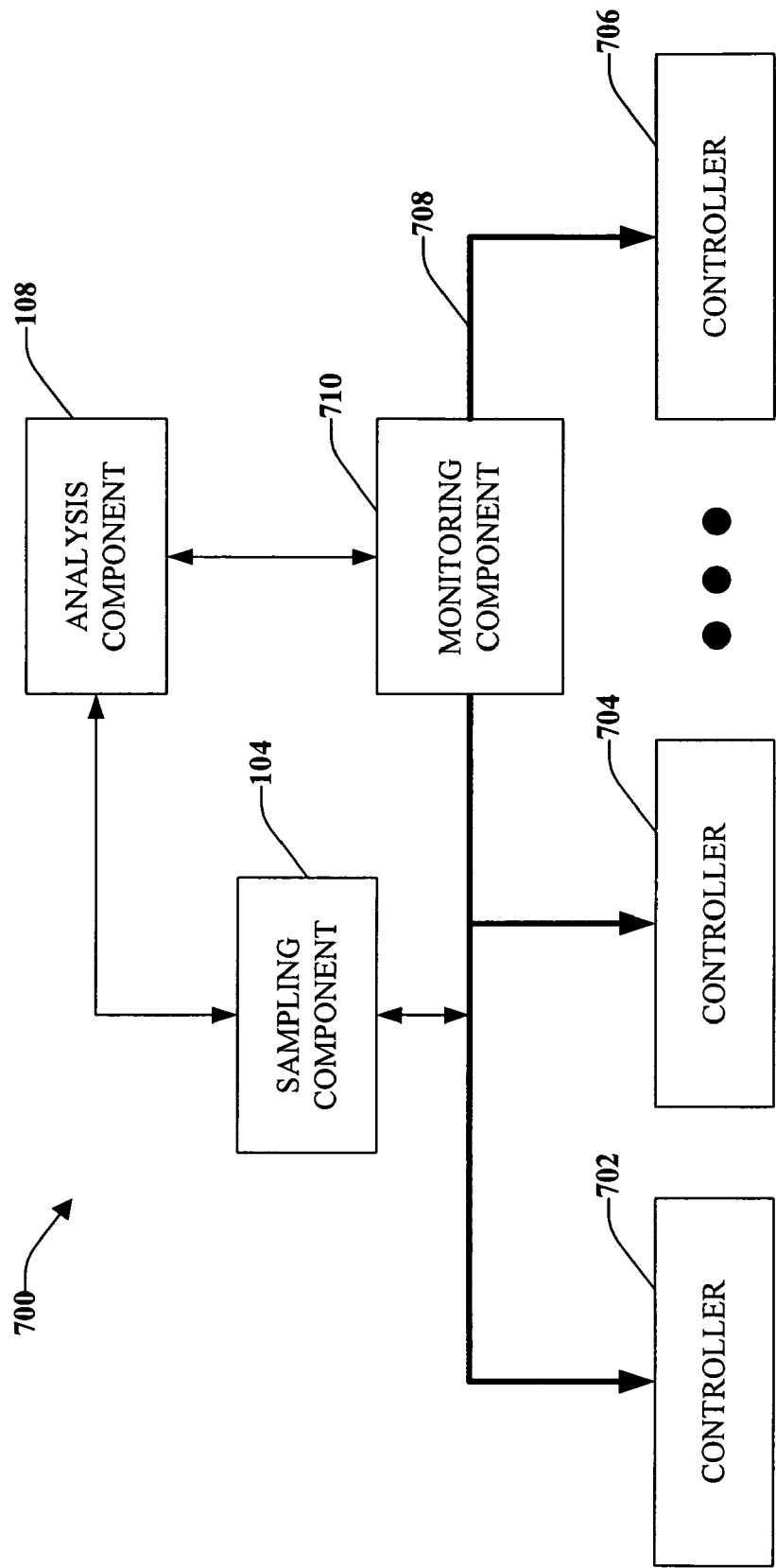
FIG. 7 illustrates a system where a backplane can be monitored in connection with automatically and dynamically determining sample rates associated with multiple controllers associated with the backplane.

Referring now to FIG. 7, a system 700 that facilitates automatic selection and logging of data is illustrated. The system 700 includes multiple controllers 702-706 that reside upon a particular backplane 708. For instance, I/O cards of the controllers 702-706 can be communicatively coupled to the backplane 708. The system 700 additionally includes a monitoring component 710 that is also coupled to the backplane 708, such that the monitoring component 710 can monitor data that is associated with the I/O cards. For example, the monitoring component 710 can include a high speed processor that enables monitoring of a large amount of data. Furthermore, data output/received by the controller (and monitored by the monitoring component 710) can conform to a hierarchically structured data model. For instance, the hierarchically structured data model can enable nested structures (rather than flat namespaces), and can be based at least in part upon ISA S88, ISA S95, and/or a combination thereof.

The monitoring component 710 is associated with the analysis component 108 that can analyze the monitored data and automatically determine which data should be retained, which should be discarded, and a sampling rate at which data should be sampled. If the monitoring component 710 is associated with sufficient processing capabilities, the analysis component 108 can reside therein. The analysis component 108 can operate continuously, such that sampling rates associated with I/O cards on the controllers 702-706 can alter based upon current conditions, past conditions, and/or a combination thereof. Upon determining which data is to be sampled and a sampling rate associated therewith, the analysis component 108 can direct the sampling component 104 to sample data from the controllers 702-706 at the prescribed rate. For instance, the sampling component 104 can be within the monitoring component 710 and/or can be a separate component that is coupled to the backplane 708. The sampling component 104 can be associated with a data repository (not shown), such that sampled data can be indexed and stored for later retrieval and/or analysis.

Figure 8:
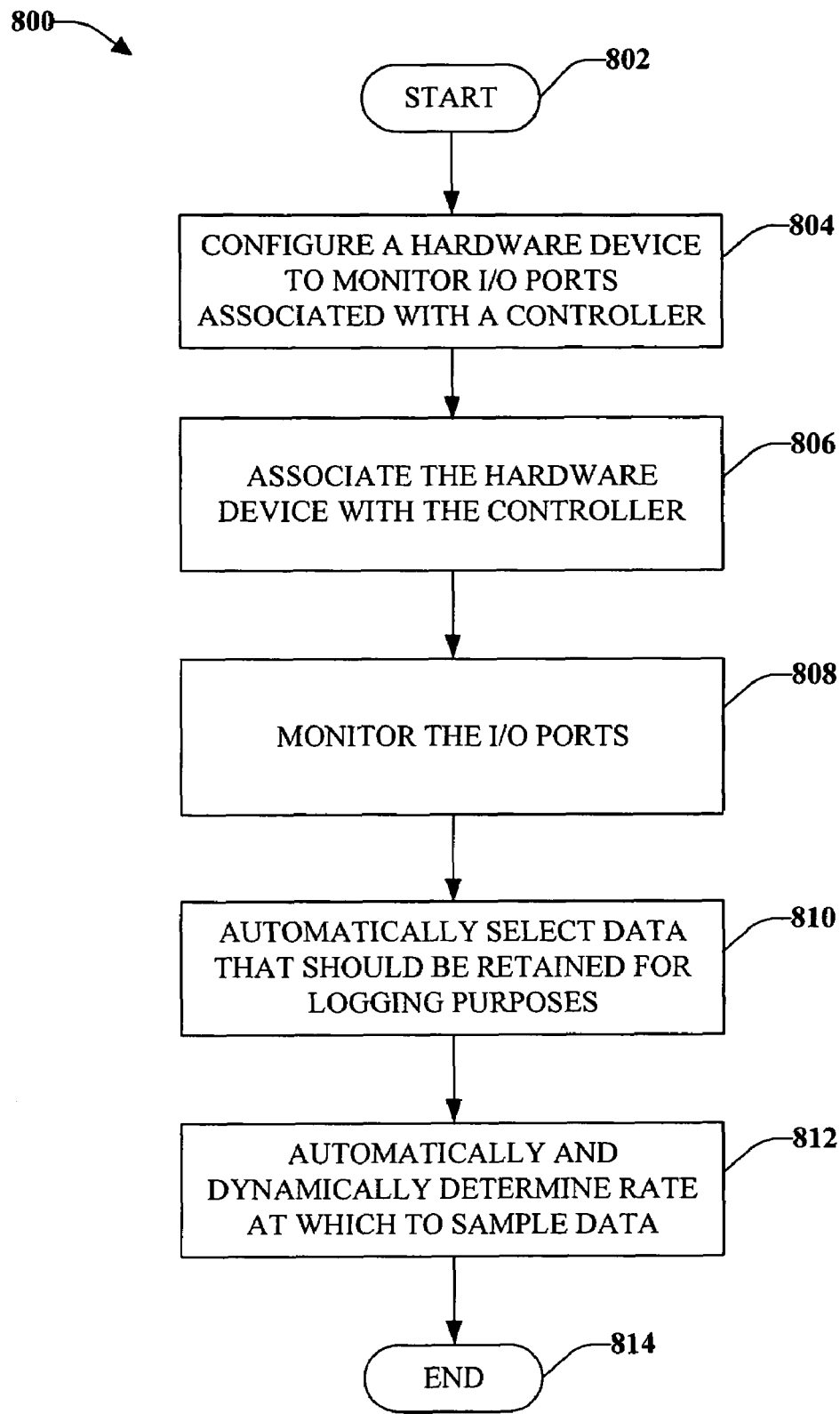
FIG. 8 is a representative flow diagram of a methodology for enabling automatic and dynamic determination of sampling rates associated with one or more controllers.
Figure 9:
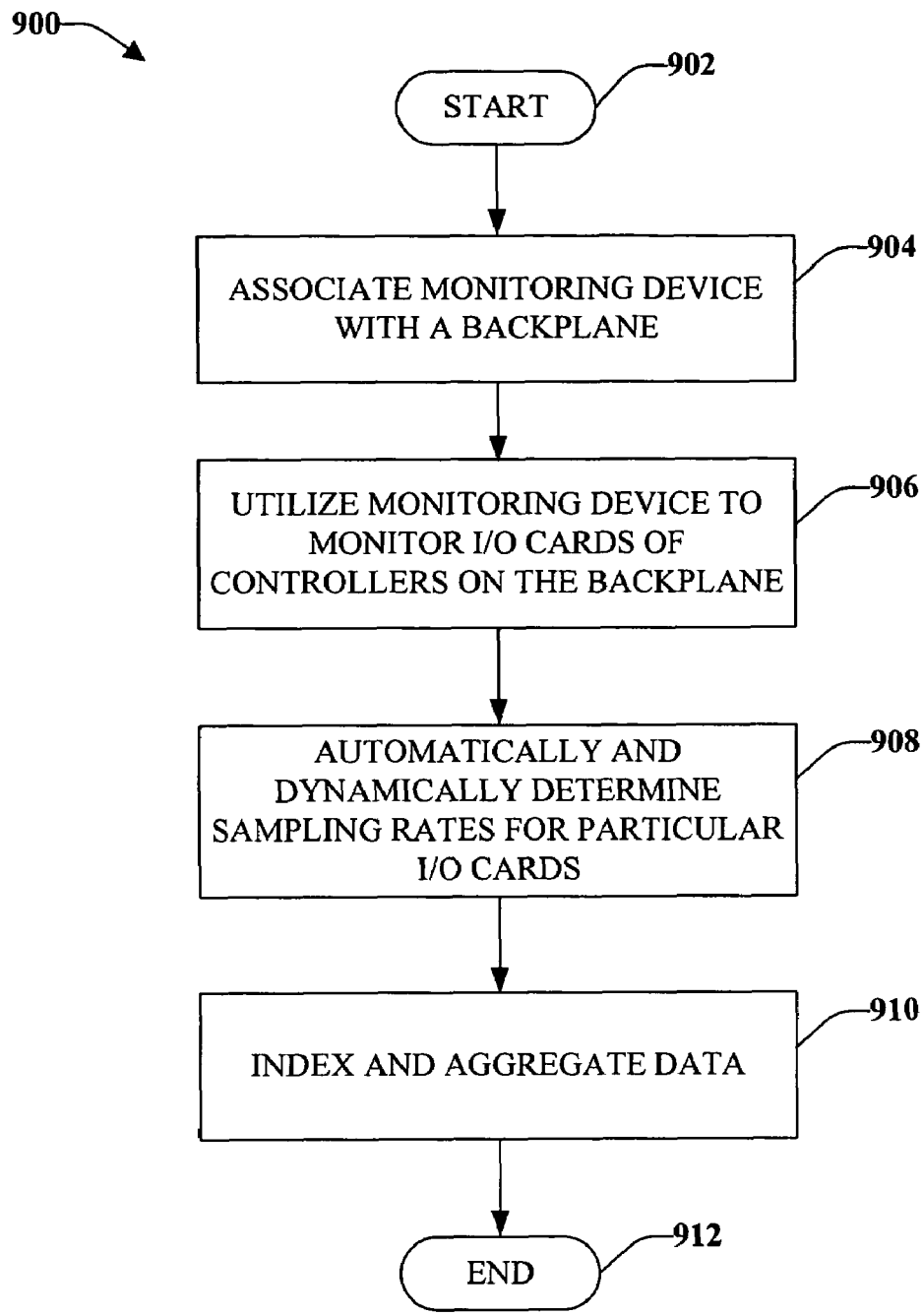
FIG. 9 is a representative flow diagram of a methodology for automatically sampling, aggregating, and indexing data in an industrial environment.
Figure 10:
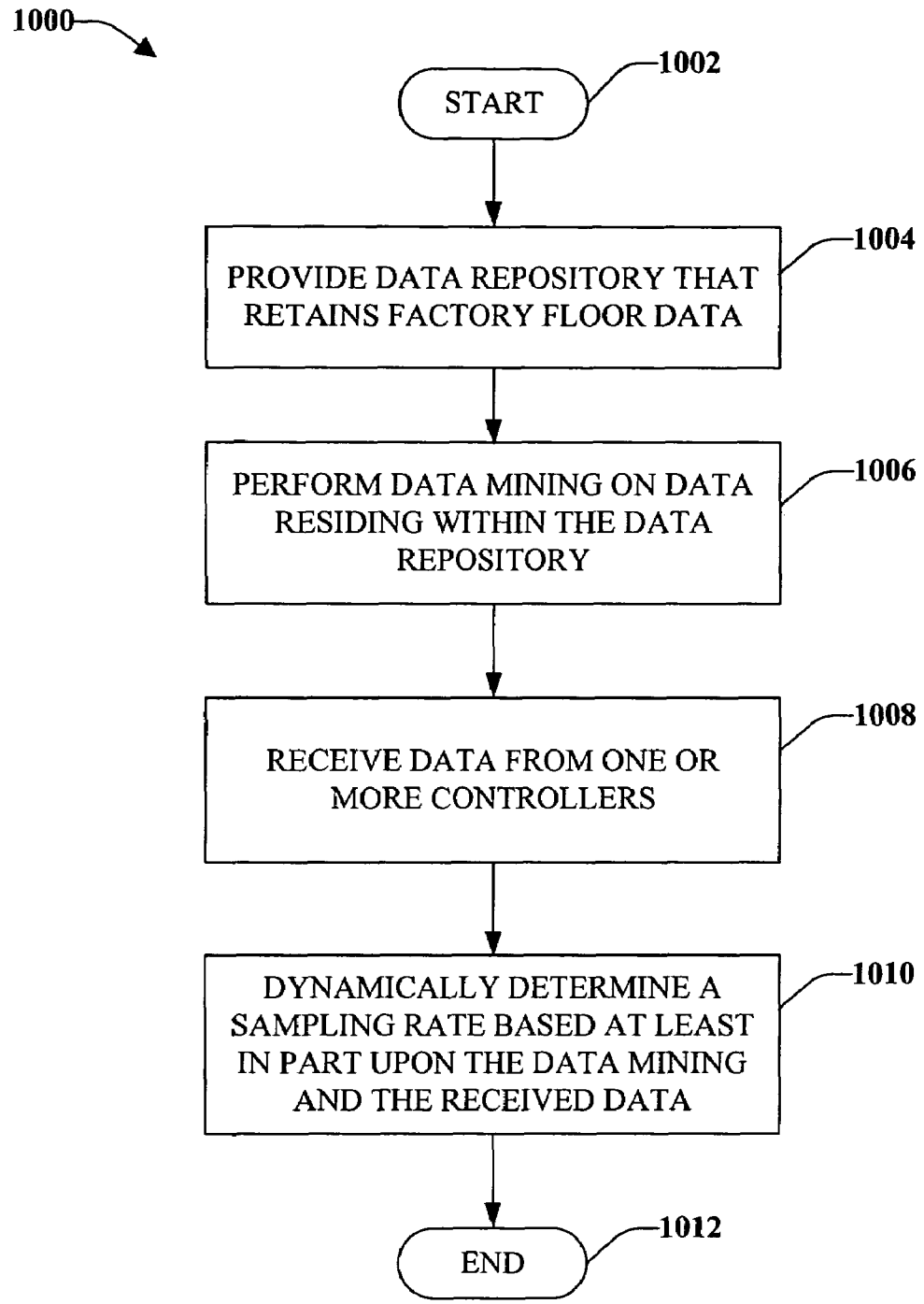
FIG. 10 is a representative flow diagram of a methodology for utilizing data mining in connection with automatically and dynamically determining a sampling rate with respect to one or more I/O ports of at least one controller.

Referring to FIGS. 8-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 8, a methodology for automatically and dynamically determining which data to retain and a rate to sample such data is illustrated. The methodology begins at 802, and at 804 a hardware device is configured to monitor I/O ports (or cards) associated with one or more controllers. For example, the hardware device can be equipped with connecting mechanisms that enable connection of the hardware device to a backplane that is associated with the controllers. Additionally, the hardware device can include sufficient processing capabilities, memory, and/or software to enable the hardware device to recognize connection of the hardware device to the backplane and to monitor particular data. At 806, the hardware device is associated with the controller. For example, the hardware device can be directly coupled to the controller and/or the hardware device can be coupled to a backplane that is associated with the controller.

At 808, I/O ports and/or cards associated with the controller are monitored by the hardware device. For instance, if a sensor is providing data to a controller, the hardware device can monitor such data at the I/O port. At 810, data that is desirably retained is automatically selected based at least in part upon the monitoring. For instance, certain data may be deemed more important due to traffic at an I/O port of the controller. Similarly, data that is associated with a large distribution may be deemed desirable to track (for logging purposes, for example). At 812, an automatic and dynamic determination is made regarding a sampling rate to associate with selected data. This determination can be based at least in part upon past data, observed distributions in sensed data, or any other suitable parameter. The methodology completes at 814.

Referring now to FIG. 9, a methodology 900 for collecting, aggregating, and indexing data within an industrial environment is illustrated. The methodology 900 starts at 902, and at 904 a monitoring device is associated with a backplane that communicatively couples a plurality of controllers. At 906, a monitoring device is utilized to monitor I/O cards of the plurality of controllers on the backplane. For example, the monitoring device can be a hardware device that can be removably attached to the backplane. At 908, an automatic and dynamic determination is made regarding sampling rates for particular inputs and/or outputs on the controllers, wherein the determination can be based at least in part upon current sensed data, results of data mining performed on previous data, and the like. At 910, sampled data is automatically aggregated and indexed to enable efficient retrieval of such sampled data. For example, sampled data from a plurality of controllers can be aggregated into desired locations and indexed according to time, process, geographic location, and the like. Indexing can be accomplished efficiently if the sampled data accords to a hierarchically structured data model—for instance, one that is based at least in part upon ISA S88 and/or ISA S95. The methodology 900 then completes at 912.

Referring now to FIG. 10, a methodology for dynamically determining a sampling rate for which to sample data associated with one or more controllers is illustrated. The methodology 1000 starts at 1002, and at 1004 a data repository is provided that maintains factory floor data. For instance, sensor data, control data, actuator states, and any other suitable data can be retained within the data repository. At 1006, data mining is performed upon the data within the data repository. For instance, correlations can be found between events or variables within the data, patterns can be recognized, trends can be determined, and the like. At 1008, data is received from I/O ports and/or cards of one or more controllers. For instance, a backplane can be monitored in connection with receiving data associated with one or more controllers. At 1010, a sampling rate at which to sample data associated with the controllers is dynamically determined based at least in part upon results of the data mining and received data. Pursuant to an example, performance of data mining can enable discernment that a temperature of an oven drastically changes after an associated sensor outputs a value above a threshold. Accordingly, if the sensor outputs such value, a dynamic determination can be made to increase a number of samples per unit of time in preparation for a rapid temperature alteration. The methodology 1000 can then complete at 1012.

Figure 11:
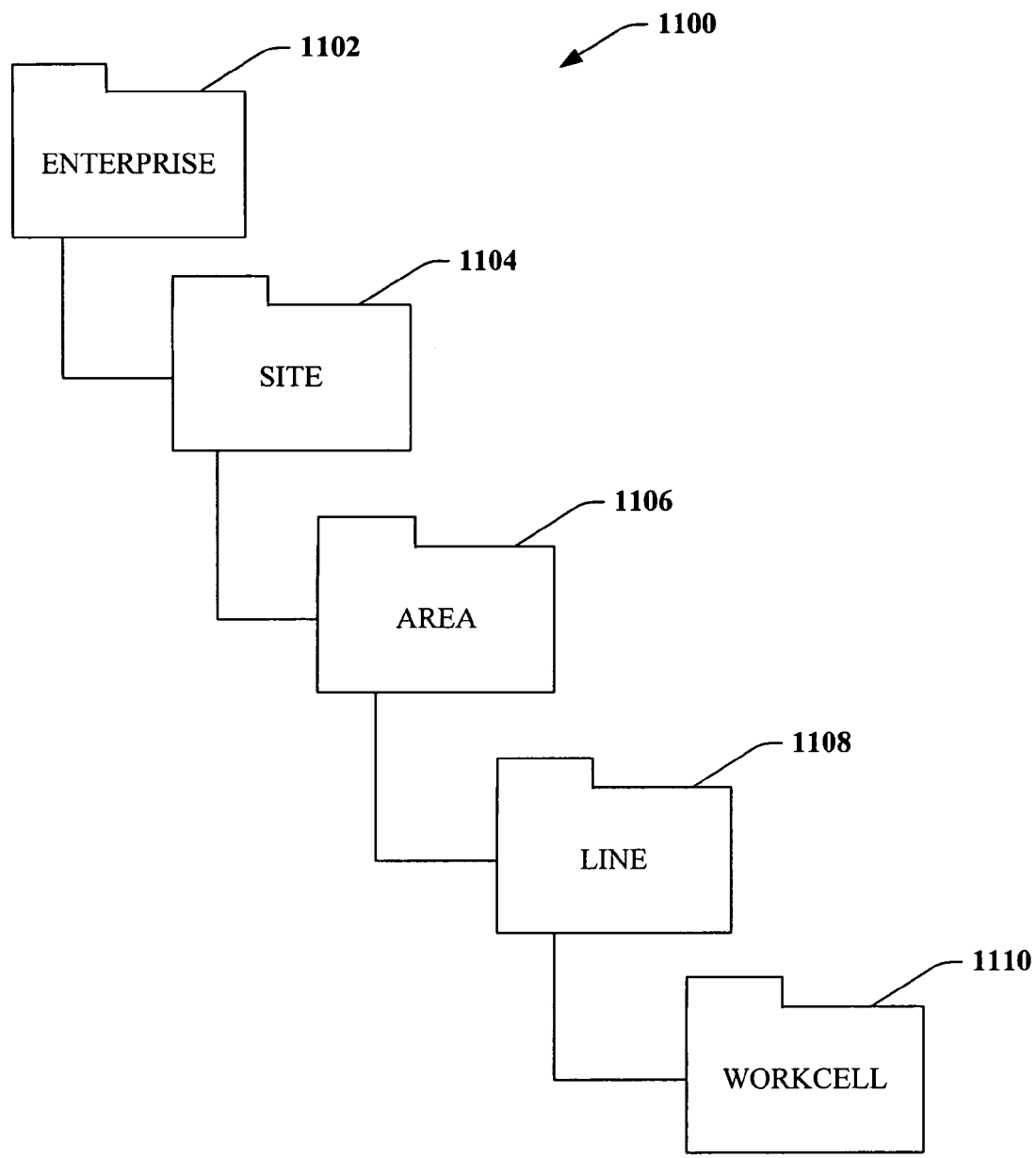
FIG. 11 illustrates an exemplary hierarchical arrangement upon which a data model can be based.

Referring now to FIG. 11, an exemplary hierarchical structure 1100 which can be utilized in connection with the hierarchically structured data model alluded to herein is illustrated. For example, the data model can facilitate nested structures, thereby mitigating deficiencies associated with data models that employ flat namespaces. The structure 1100 includes an enterprise level 1102, where a particular enterprise can be represented within data structured in accordance with a hierarchical data model. Beneath the enterprise level 1102 level can be a site level 1104, so that a particular factory (site) within an enterprise can be represented within a data packet. Beneath the site level 1104 an area level 1106 can exist, which specifies an area within the factory that relates to the data. A line level 1108 can lie beneath the area level 1106, wherein the line level 1108 is indicative of a line associated with particular data. Beneath the line level 1108 a workcell level 1110 can exist, thereby indicating a workcell associated with the data. Utilizing a nested, hierarchical data model, PLCs can become more aware of data associated therewith. Furthermore, the hierarchy 1100 can be customized by an owner of such hierarchy. For instance, more granular objects/levels can be defined within the hierarchy 1100. Use of such a robust data model enables aggregation and indexing of collected data to occur more efficiently when compared to flat data models.

Figure 12:
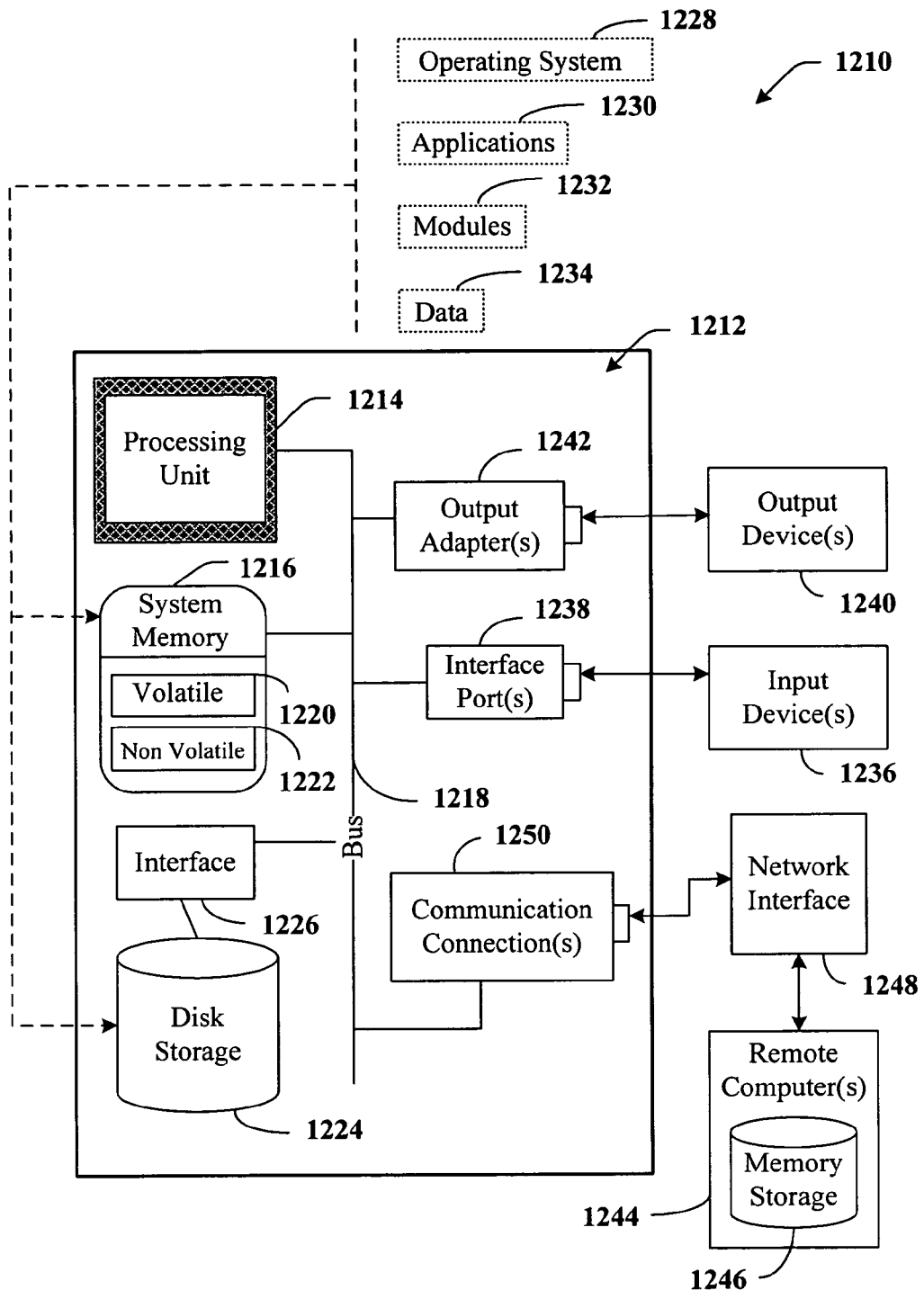
FIG. 12 is an exemplary computing environment that can be utilized in connection with the claimed subject matter.

With reference to FIG. 12, an exemplary environment 1210 for implementing various aspects of the claimed subject matter, including dynamically determining a sampling rate at which to sample data on a factory floor, includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable PROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
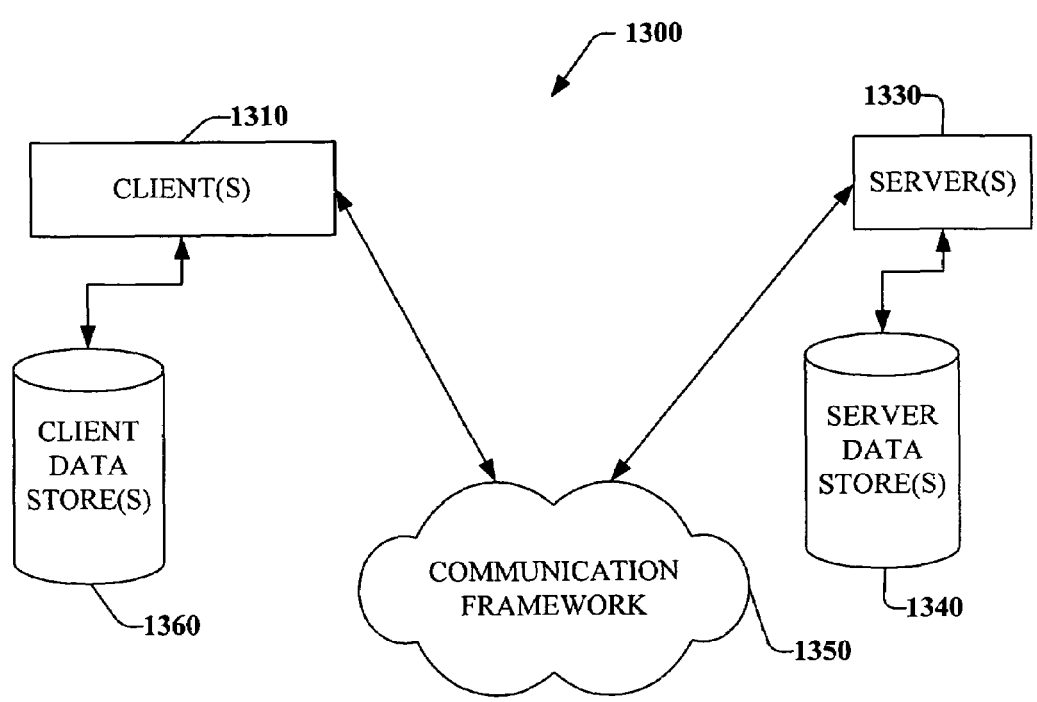
FIG. 13 is an exemplary networking environment that can be utilized in connection with the claimed subject matter.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 can be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the claimed subject matter. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates determination of a sampling rate to utilize in connection with sampling data in an industrial environment, comprising:
   one or more data repositories comprising historical data associated with at least one of industrial machines or industrial processes;
   a receiver component that receives data from one or more I/O ports of a controller; and
   an analysis component that employs probabilistic analysis to correlate the historical data to the received data to predict a failure of the at least one of industrial machines or industrial processes, the analysis component automatically determines a rate at which data associated with the one or more I/O ports is to be sampled based at least in part upon the predicted failure.

2. The system of claim 1, further comprising a sampling component that samples data at the rate determined by the analysis component.

3. The system of claim 2, wherein the analysis component further determines to initiate sampling from a particular sensor based upon the predicted failure.

4. The system of claim 2, wherein the controller comprises the sampling component or the sampling component is coupled to a backplane that is associated with the controller.

5. The system of claim 2, further comprising a logging component that directs data sampled by the sampling component to the one or more data repositories.

6. The system of claim 2, further comprising a simulation engine, data sampled by the sampling component is provided to the simulation engine to update the simulation engine, the simulation engine utilizes one or more of a digital video, a still photo, or a generated three-dimensional simulation.

7. The system of claim 2, further comprising:
   a data mining component that performs data mining on the historical data within the data repository to locate correlations between the historical data, determine patterns within the historical data, or determine trends within the historical data; and
   the analysis component determines the sampling rate based at least in part upon results of the data mining.

8. The system of claim 2, the analysis component and the controller are coupled to a backplane.

9. The system of claim 2, further comprising:
   an audit component that receives input from a user identifying a specific industrial process to audit and accesses the data repository to generate an audit log in accordance with the user input.

10. The system of claim 1, further comprising a security component that authenticates an identity of the user and determines whether the user is authorized to manually alter the sampling rate.

11. The system of claim 10, the controller comprises the security component.

12. The system of claim 2, the controller comprises the analysis component.

13. The system of claim 2, further comprising multiple sampling components associated with multiple controllers, wherein the multiple sampling components sample data at different sampling rates associated with different I/O ports of the multiple controllers.

14. The system of claim 2, the analysis component automatically determines rates at which data associated with multiple I/O ports of a plurality of controllers is sampled based at least in part upon data received from the multiple I/O ports.

15. The system of claim 14, further comprising an aggregation component that automatically aggregates and indexes data sampled from the plurality of controllers.

16. The system of claim 15, the aggregation component facilitates aggregation of data sampled from the plurality of controllers through a hierarchical arrangement of data repositories.

17. The system of claim 2, further comprising a monitoring component that is coupled to a backplane that is associated with the controller, the monitoring component monitors I/O ports associated with the controller and relays results of the monitoring to the analysis component, the analysis component analyzes the results and automatically determines which data should be retained and which data should be discarded.

18. A methodology for automatically and dynamically determining a sampling rate, comprising:
   controlling one or more industrial processes with a plurality of controllers;
   logging historical data associated with the one or more industrial processes;
   configuring a hardware device to monitor a plurality of I/O ports, the plurality of I/O ports are associated with the plurality of controllers;
   receiving data from monitoring the I/O ports;
   predicting a failure of the one or more industrial processes based upon identifying a pattern associated with the received data and historical data; and
   automatically determining one or more rates at which to sample data associated with the plurality of I/O ports based at least in part upon the predicted failure of the one or more industrial processes.

19. The methodology of claim 18, configuring the hardware device to monitor the plurality of I/O ports comprises coupling the hardware device to a backplane that is associated with the plurality of controllers.

20. The methodology of claim 18, further comprising:
   performing data mining on the historical data to at least one of locate correlations between the historical data, determine patterns within the historical data, or determine trends within the historical data; and
   automatically determining rates at which to sample the data associated with the plurality of I/O ports based at least in part upon results of the data mining.

21. The methodology of claim 18, further comprising automatically aggregating sampled data from the plurality of I/O ports.

22. The methodology of claim 21, further comprising automatically indexing the aggregated data.

23. The methodology of claim 18, further comprising automatically selecting a subset of the I/O ports with respect to which data is sampled based at least in part upon the monitoring.

24. The methodology of claim 18, the sampled data conforms to a hierarchically structured data model.

25. The methodology of claim 24, the hierarchically structured data model is based at least in part upon one or more of ISA S88 and ISA S95.

26. The methodology of claim 18, further comprising generating an audit log with the sampled data.

27. An industrial data sampling system, comprising:
- a data mining component that performs data mining on data from an I/O card of a controller and historical data associated with the controller, and employs computational techniques based on one or more of statistics, machine learning, or pattern recognition to identify a pattern, a trend, or a correlation predicative of at least one of a device failure associated with the controller or a process failure associated with the controller;
- an analysis component that analyzes data and determines selects a sampling rate to sample data associated with the I/O card based at least in part upon the predicted device failure or process failure; and
- a sampling component communicatively coupled to the analysis component that samples data associated with the I/O card at the selected sampling rate.

28. A system that facilitates dynamic alteration of sampling rates associated with multiple controllers, comprising:
- means for analyzing data associated with an I/O card of a controller, wherein the controller controls at least one of an industrial device or an industrial process;
- means for predicating a failure of at least one of the industrial device or the industrial process based upon the analysis;
- means for identifying a sampling rate at which to sample data associated with the I/O card based at least in part upon the predicted failure; and
- means for effectuating the sampling rate with respect to the I/O card.

* * * * *

UNITED STATES PATENT AND TRADEMARK OFFICE
CERTIFICATE OF CORRECTION

PATENT NO. : 7,647,131 B1 Page 1 of 1
APPLICATION NO. : 11/371764
DATED : January 12, 2010
INVENTOR(S) : Randall P. Sadowski et al.

It is certified that error appears in the above-identified patent and that said Letters Patent is hereby corrected as shown below:

IN THE CLAIMS:
1. In Column 18, Line 1, in Claim 27, delete "analyzes data that determines," therefor. (Amendments to the claims dated June 5, 2009, page 6, claim 27, line 7)

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,131 B1 | |
| APPLICATION NO. | : 11/371764 | |
| DATED | : January 12, 2010 | |
| INVENTOR(S) | : Sadowski et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this

Sixteenth Day of November, 2010

David J. Kappos
*Director of the United States Patent and Trademark Office*